(12) United States Patent
Harada et al.

(10) Patent No.: US 9,898,929 B2
(45) Date of Patent: Feb. 20, 2018

(54) VEHICLE DRIVING ASSISTANCE APPARATUS

(71) Applicants: Tomoaki Harada, Toyota (JP); Yosuke Ito, Okazaki (JP)

(72) Inventors: Tomoaki Harada, Toyota (JP); Yosuke Ito, Okazaki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 199 days.

(21) Appl. No.: 14/780,189

(22) PCT Filed: Apr. 10, 2013

(86) PCT No.: PCT/JP2013/060863
§ 371 (c)(1),
(2) Date: Sep. 25, 2015

(87) PCT Pub. No.: WO2014/167680
PCT Pub. Date: Oct. 16, 2014

(65) Prior Publication Data
US 2016/0042645 A1 Feb. 11, 2016

(51) Int. Cl.
*G08G 1/16* (2006.01)
*B60W 50/14* (2012.01)
(Continued)

(52) U.S. Cl.
CPC .............. *G08G 1/165* (2013.01); *B60W 30/09* (2013.01); *B60W 50/14* (2013.01); *G01S 13/867* (2013.01); *G01S 13/931* (2013.01); *G05D 1/0246* (2013.01); *G06K 9/00805* (2013.01); *G06K 9/00818* (2013.01); *G06K 9/00825* (2013.01);
(Continued)

(58) Field of Classification Search
None
See application file for complete search history.

(56) References Cited

U.S. PATENT DOCUMENTS 8,065,084 B2\* 11/2011 Urban .................. B60W 40/02
340/435
2008/0162010 A1\* 7/2008 Klotz ................ B60K 31/0008
701/93
(Continued)

FOREIGN PATENT DOCUMENTS

| EP | 2 081 168 A2 | 7/2009 |
|----|----|----|
| EP | 2985746 A1 | 2/2016 |
| JP | 2003-141698 | 5/2003 |
| JP | 2004-161100 | 6/2004 |
| JP | 2006-99715 | 4/2006 |
| JP | 2012-8718 | 1/2012 |
| JP | 2012-89114 | 5/2012 |

*Primary Examiner* — Thomas G Black
*Assistant Examiner* — Demetra Smith-Stewart
(74) *Attorney, Agent, or Firm* — Finnegan, Henderson, Farabow, Garrett & Dunner, LLP

(57) ABSTRACT

A vehicle driving assistance apparatus has a sensor that detects an object around an own vehicle; and a processing apparatus that determines whether the object detected by the sensor is a static vehicle or a roadside static object, carries out driving assistance if a first driving assistance carrying-out condition is satisfied when determining as a static vehicle and carries out the driving assistance if a second driving assistance carrying-out condition is satisfied when determining as a roadside static object. A threshold concerning the first driving assistance carrying-out condition is lower than a threshold concerning the second driving assistance carrying-out condition.

10 Claims, 2 Drawing Sheets

(51) Int. Cl.
    *B60W 30/09*     (2012.01)
    *G05D 1/02*     (2006.01)
    *G01S 13/93*     (2006.01)
    *G06K 9/00*     (2006.01)
    *G01S 13/86*     (2006.01)

(52) U.S. Cl.
CPC ... *B60W 2050/143* (2013.01); *B60W 2420/42* (2013.01); *B60W 2420/52* (2013.01); *B60W 2550/10* (2013.01); *B60W 2550/146* (2013.01); *B60W 2600/00* (2013.01); *B60W 2750/308* (2013.01); *G01S 2013/935* (2013.01); *G01S 2013/9346* (2013.01); *G01S 2013/9353* (2013.01); *G06K 2209/23* (2013.01)

(56) References Cited

U.S. PATENT DOCUMENTS

| | | | | |
|---|---|---|---|---|
| 2009/0278672 | A1* | 11/2009 | Weilkes | B60W 40/02 340/435 |
| 2011/0187863 | A1* | 8/2011 | Glander | G01S 13/931 348/148 |
| 2013/0060548 | A1* | 3/2013 | Shimizu | G01S 17/023 703/8 |
| 2013/0223686 | A1* | 8/2013 | Shimizu | G08G 1/166 382/103 |
| 2015/0112570 | A1* | 4/2015 | Schmudderich | G01S 13/931 701/93 |
| 2016/0042645 | A1 | 2/2016 | Harada et al. | |

\* cited by examiner

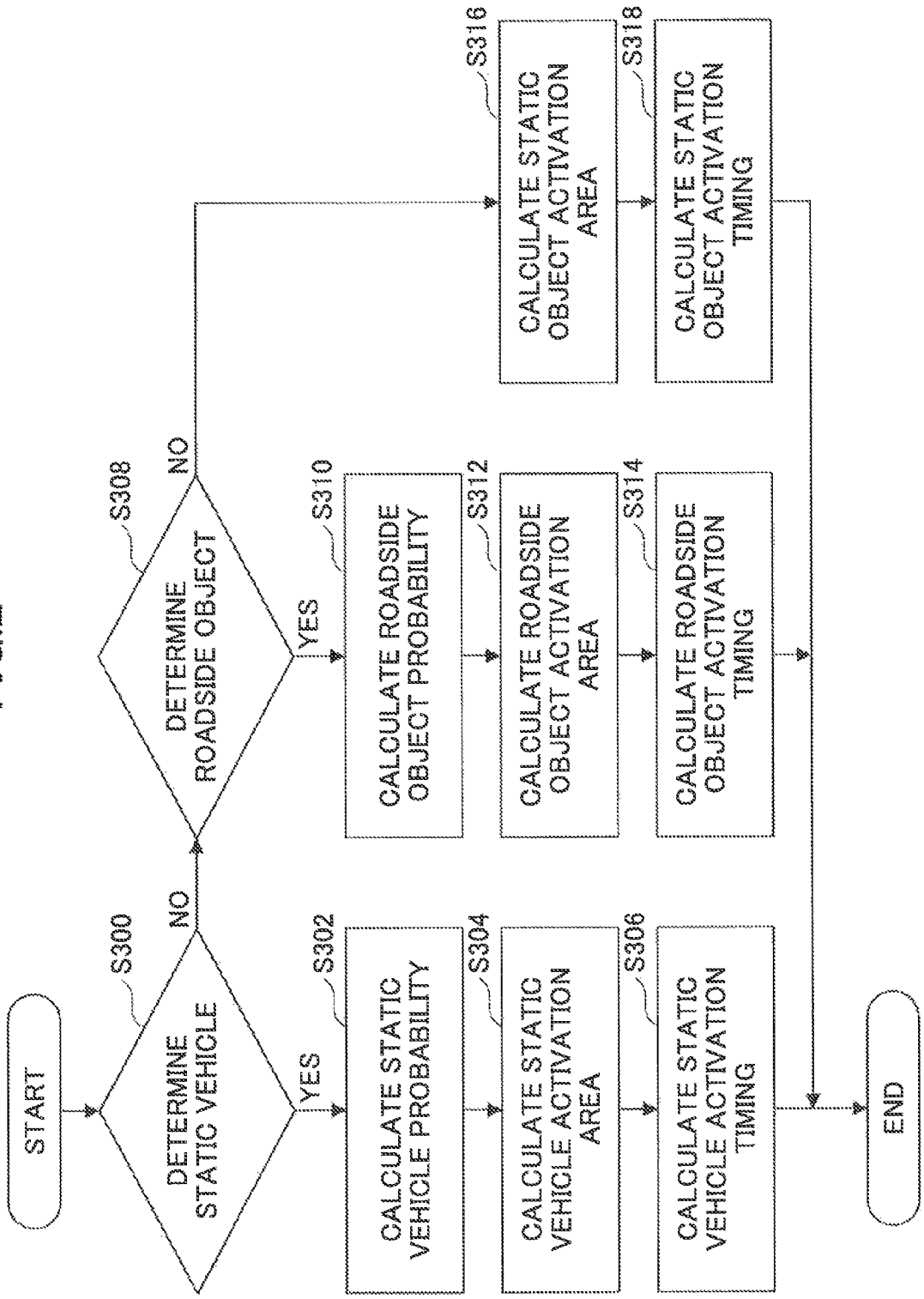

VEHICLE DRIVING ASSISTANCE APPARATUS

CROSS-REFERENCE TO RELATED APPLICATIONS

This application is a national phase application of International Application No. PCT/JP2013/060863, filed Apr. 10, 2013, the content of which is incorporated herein by reference.

TECHNICAL FIELD

The present disclosure relates to a vehicle driving assistance apparatus.

BACKGROUND ART

Until now, an art has been known where, in an obstacle detection apparatus determining a static object as an obstacle on a travelling lane when a period of time of being able to continuously detect the static object is greater than or equal to a threshold, the threshold is reduced and a timing of detecting the obstacle is made earlier when a likelihood that the obstacle is present is high due to a traffic jam, a red light or so (for example, see Patent Reference No. 1).

PRIOR ART REFERENCE

Patent Reference

Patent Reference No. 1: Japanese Laid-Open Patent Application No. 2003-141698

SUMMARY OF THE INVENTION

Problem to be Solved by the Invention

However, in the configuration of the above-mentioned Patent Reference No. 1, a determination is made as the obstacle without regard to the type of the static object. Therefore, there is a problem that it is not possible to carry out driving assistance such as calling attention or so concerning the obstacle in an appropriate manner depending on the type of the static object.

Therefore, the present disclosure has an object to provide a vehicle driving assistance apparatus being able to carry out driving assistance concerning a static object in a manner appropriate depending on a type of the static object.

Means to Solve the Problem

According to one aspect of the present disclosure, a vehicle driving assistance apparatus is provided which has a sensor detecting an object around own vehicle; and a processing apparatus determining whether the object detected by the sensor is a static vehicle or a roadside static object, carrying out driving assistance if a first driving assistance carrying-out condition is satisfied when determining the object as a static vehicle, and carrying out the driving assistance if a second driving assistance carrying-out condition is satisfied when determining the object as a roadside static object.

A threshold concerning the first driving assistance carrying-out condition is lower than a threshold concerning the second driving assistance carrying-out condition.

Advantageous Effects of the Invention

According to the present disclosure, it is possible to acquire a vehicle driving assistance apparatus being able to carry out driving assistance concerning a static object in a manner appropriate depending on a type of the static object.

BRIEF DESCRIPTION OF DRAWINGS

FIG. 2 is a flowchart showing one example of a process carried out by a processing apparatus 10.

MODE FOR CARRYING OUT THE INVENTION

Figure 1:
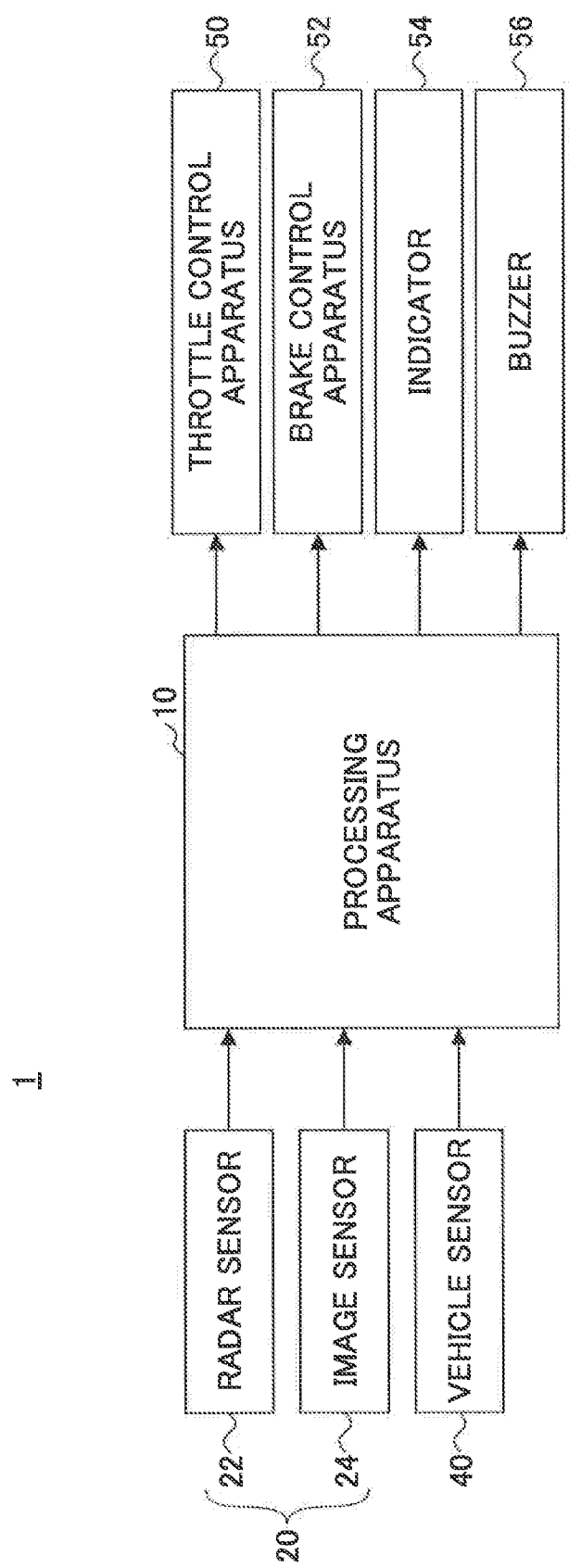
FIG. 1 is a drawing showing a configuration of a vehicle driving assistance apparatus 1 according to one embodiment.

Below, each embodiment will be described in detail with reference to accompanying drawings.

FIG. 1 is a drawing showing a configuration of a vehicle driving assistance apparatus 1 according to one embodiment. The vehicle driving assistance apparatus 1 is mounted in a vehicle. The vehicle driving assistance apparatus 1 includes a processing apparatus 10.

The processing apparatus 10 can be configured with a processor including a CPU. Various functions of the processing apparatus 10 (including functions that will be described now) can be implemented by any hardware, software, firmware or combination thereof. For example, any or all of the functions of the processing apparatus 10 can be implemented by an ASIC (application-specific integrated circuit) for a specific use, an FPGA (Field Programmable Gate Array), or a DSP (digital signal processor). Also, the processing apparatus 10 can be implemented by a plurality of processing apparatuses. Note that, typically, the processing apparatus 10 is implemented as an ECU (electronic control unit).

To the processing apparatus 10, an object detection sensor 20 detecting an object around the own vehicle is connected. In the example shown in FIG. 1, to the processing apparatus 10, a radar sensor 22 and an image sensor 24 as examples of the object detection sensor 20 are connected. Note that it is possible that only one of the radar sensor 22 and the image sensor 24 is used. Note that some of the functions of the processing apparatus 10 described now can be implemented by a processing apparatus that can be incorporated in the object detection sensor 20.

The radar sensor 22 uses electromagnetic waves (for example, millimeter waves), light waves (for example, laser) or ultrasonic waves as detection waves, and detects a state of a target in front of the vehicle. Note that the target means any object that can be an obstacle for the own vehicle, in other words, any object, a collision of which with the own vehicle should be avoided. For example, the target can be another vehicle, a pedestrian, a static object, or so. The radar sensor 22 detects, in a predetermined cycle, information indicating a relationship between the target and the own vehicle, for example, position information (a lateral position, a distance or so) of the target with respect to the own vehicle. It is possible that the position information (detection result) of the target is transmitted to the processing apparatus 10 in a predetermined cycle. Note that it is possible that the function of the radar sensor 22 (for example, the function of calculating the position of the target) is implemented by the processing apparatus 10.

The image sensor 24 includes a camera including an imaging device such as a CCD (charge-coupled apparatus)

or a CMOS (complementary metal oxide semiconductor), and an image processing apparatus, and carries out image recognition of a state of a target in front of the vehicle. The camera of the image sensor 24 can be a stereo camera, or, in another way, can include two or more cameras. The image sensor 24 detects the information indicating a relationship between the target and the own vehicle, for example, position information of the target with respect to the own vehicle, based on the image recognition result, in a predetermined cycle. The position information of the target can include information concerning the position (distance) of the target in the forward/backward direction of the own vehicle, and information concerning the lateral position of the target in the lateral direction (width direction). The lateral position of the target can be calculated based on the center position in the lateral directions of the collection of pixels concerning the target, or can be calculated as the range between the left-edge lateral position and the right-edge lateral position thereof. The information thus taken by the image sensor 24 (detection result) can be transmitted to the processing apparatus 10, for example, in a predetermined frame cycle. Note that the image processing function of the image processing apparatus (for example, the function of calculating the position of the target) can be implemented by the processing apparatus 10.

Note that if the image sensor 24 is a stereo camera, it is possible that images taken by the two cameras (stereo image data) undergo an edge detection process and then a stereo matching process. In the stereo matching process, it is possible that one of the images is used as a reference image, a SAD (Sum of Absolute Differences) operation, for example, is carried out, and a parallax image is generated based on a SAD waveform. At this time, it is possible that the pixels having approximately the same parallax (parallax points) are grouped, and the collection of pixels thus grouped is recognized as the pixel collection concerning the target. It is also possible that pattern matching is carried out on the pixel collection having approximately the same parallax, and the pixel collection matching a master pattern is recognized as the pixel collection concerning the target.

Note that if both the radar sensor 22 and the image sensor 24 are used, respective sets of the position information of the target can be used in such a manner as to appropriately combine them. For example, it is possible that the position information and the speed information of the target concerning the position (distance) in the forward/backward direction of the own vehicle are acquired by the radar sensor 22 and the position information of the target concerning the position in the lateral direction (lateral position) of the own vehicle is acquired by the image sensor 24.

To the processing apparatus 10, other than the above, a vehicle sensor 40 acquiring vehicle information can be connected. The vehicle sensor 40 can include a vehicle speed sensor (wheel speed sensor) detecting the vehicle speed, an acceleration sensor outputting a signal according to the acceleration of the vehicle in the vehicle forward/backward direction or the vehicle width direction, a yaw rate sensor outputting a signal according to the angular velocity around the center-of-gravity axis of the vehicle, and/or the like. Note that the acceleration sensor and the yaw rate sensor can be installed, for example, near the center of gravity of the vehicle (the floor tunnel or so).

To the processing apparatus 10, other than the above, a navigation apparatus, or so, can be connected. From the navigation apparatus, it is also possible that the road shape (curvature) in front of the vehicle, vehicle position information based on positioning by GPS (Global Positioning System) and/or the like are provided. It is also possible that, to the processing apparatus 10, the road shape information in front of the vehicle is provided via communication with the outside (for example, a center server).

To the processing apparatus 10, a throttle control apparatus (for example, an engine ECU) 50, a brake control apparatus (for example, a brake ECU) 52, an indicator 54 and a buzzer 56, as examples of control target apparatuses/devices, are connected.

In response to a command from the processing apparatus 10, the throttle control apparatus 50 controls the throttle position and adjusts the engine output. For example, it is possible that if the processing apparatus 10 determines that a collision between the own vehicle and the target is unavoidable, the processing apparatus 10 reduces the engine output via the throttle control apparatus 50.

In response to a command from the processing apparatus 10, the brake control apparatus 52 controls a brake actuator and/or valve, and adjusts braking force (the wheel cylinder pressure). For example, it is possible that if the processing apparatus 10 determines that a collision between the own vehicle and the target is unavoidable, the processing apparatus 10 automatically generates braking force via the brake control apparatus 52.

In response to a command from the processing apparatus 10, the indicator 54 displays an alarm. The alarm can be one concerning a collision between the own vehicle and the target. The indicator 54 can be any display apparatus/device. For example, the indicator 54 can be an indicator included in a meter, a display apparatus/device (for example, a liquid crystal display) installed on an instrument panel or so, a HUD (Head-Up Display), or so. Note that it is possible that the indicator 54 is directly controlled by the processing apparatus 10, or is controlled by the processing apparatus 10 via another control apparatus.

The buzzer 56 outputs an alarm sound in response to a command from the processing apparatus 10. The alarm sound can be one concerning a collision between the own vehicle and the target. Note that it is possible that the buzzer 56 is directly controlled by the processing apparatus 10, or is controlled by the processing apparatus 10 via another control apparatus.

Note that the control target apparatuses/devices can include another protection apparatus(es) such as an apparatus that, when determining that a collision between the own vehicle and the target is unavoidable, varies the vertical position and/or the forward/backward position of a bumper(s), a seat-belt pre-tensioner that winds a seat belt(s) by a predetermined amount, and/or the like.

Next, examples of various processes carried out by the processing apparatus 10 will be described.

The processing apparatus 10 determines whether the target detected by the object detection sensor 20 is a static object, based on information from the object detection sensor 20. It is possible that whether the target is a static object is determined based on whether the relative speed of the target corresponds to a minus of the speed of the own vehicle, based on the relative speed information from the object detection sensor 20. It is possible that the speed of the own vehicle is determined based on the vehicle speed sensor or so.

The processing apparatus 10 determines whether the static object detected by the object detection sensor 20 is a static vehicle or a roadside static object based on information from the object detection sensor 20. The roadside static object can mean, typically, a roadside static object installed at the roadside. For example, the roadside static object can be a guard rail, walls on both sides of a road (for example, concrete walls), side strips (steps), poles installed together with a guard rail or so, or the like. It is possible to exclude, from the roadside static objects, static objects such as objects installed above roads (signs and bulletin boards) and manholes installed on roads, which cannot be obstacles. It is possible to determine whether the static object is a static vehicle or a roadside static object in any manner.

For example, if the radar sensor 22 is used, it is possible to detect a static vehicle based on the number of reflecting points having approximately the same positions (lateral positions or distances) and approximately the same relative speeds, the width and the length (the distance from the front to the back) of the collection of the reflecting points, and/or the like. For example, if there are a predetermined number (for example, 4) or more of reflecting points within a predetermined range of predetermined width and length with respect to a predetermined reference point, it is possible to determine, as a static vehicle, the static object concerning the predetermined number or more of reflecting points. At this time, the predetermined width and length (the predetermined range) can correspond to the width and the length of a vehicle, and it is possible to consider variation thereof depending on the type of the vehicle. It is also possible to detect a roadside static object (a guard rail on a curved road, or so) based on the curvature radius of a collection of successively connected reflecting points (for example, the degree of curvature of a curve acquired from curve approximation of a plurality of the reflecting points).

If the image sensor 24 is used, for example, in the same way, it is possible to detect a static vehicle based on the number of pixels (parallax points) having approximately the same positions (lateral positions or distances) and approximately the same relative speeds, the width and length (the distance from the front to the back) of the collection of the parallax points, and/or the like. It is also possible to prepare a master pattern corresponding to a static vehicle, and detect a static vehicle based on a pattern matching result using the master pattern. At this time, it is possible to prepare a plurality of the master patterns depending on differences in types of vehicles. In the same way, it is also possible to prepare a master pattern corresponding to a roadside static object, and detect a roadside static object based on a pattern matching result using the master pattern. At this time, it is possible to prepare a plurality of the master patterns depending on differences in (types of) roadside static objects.

If the processing apparatus 10 determines that the static object detected by the object detection sensor 20 is a static vehicle, the processing apparatus 10 calculates a static vehicle probability as an index indicating a likelihood (probability or reliability) that the static object detected by the object detection sensor 20 is a static vehicle. A method of calculating the static vehicle probability is any method. For example, it is possible to calculate the static vehicle probability based on the continuity of detecting the static vehicle by the object detection sensor 20. In this case, for example, based on a detection result acquired from the object detection sensor 20 in every predetermined cycle, a count value is incremented if the corresponding static vehicle is detected (a determination is made as being the corresponding static vehicle) in the cycle, whereas the count value is decremented if the corresponding static vehicle is not detected (a determination is made as not being the corresponding static vehicle) in the cycle. In this case, it is possible that the count value represents the static vehicle probability.

It is also possible to calculate the static vehicle probability by using other information (information other than the target information from the object detection sensor 20). For example, if the signal in the direction in which the vehicle is traveling is red (for example, recognized by the image sensor 24), or a traffic jam is occurring in the direction in which the vehicle is travelling (for example, information from the navigation apparatus or the outside), a likelihood that a static vehicle is present in the direction in which the vehicle is traveling is high. Therefore, if such a situation is detected, the static vehicle probability can be added (increased) in comparison to the other cases.

If the processing apparatus 10 determines that the static object detected by the object detection sensor 20 is a roadside static object, the processing apparatus 10 calculates a roadside static object probability as an index indicating a likelihood (probability or reliability) that the static object detected by the object detection sensor 20 is a roadside static object. A method of calculating the roadside static object probability is any method. For example, it is possible to calculate the roadside static object probability based on the continuity of detecting the roadside static object by the object detection sensor 20. In this case, for example, based on a detection result acquired from the object detection sensor 20 in every predetermined cycle, a count value is incremented if the corresponding roadside static object is detected (a determination is made as being the corresponding roadside static object) in the cycle, whereas the count value is decremented if the corresponding roadside static object is not detected (a determination is made as not being the corresponding roadside static object) in the cycle. In this case, it is possible that the count value represents the roadside static object probability.

It is also possible to calculate the roadside static object probability by using other information (information other than the target information from the object detection sensor 20). For example, if the road in front of the vehicle is a curved road, a likelihood that a roadside static object is present in front of the vehicle is high. Therefore, if such a situation is detected, the roadside static object probability can be added (increased) in comparison to the other cases. It can be determined that the road in front of the vehicle is a curved road based on white-line recognition information from the image sensor 24 (the curvature radius of a white line), a road-sign recognition result (a curve sign) from the image sensor 24, road-shape information and/or the own-vehicle position information from the navigation apparatus, or the like. It is also possible to determine that the road in front of the vehicle is a curved road based on a past travelling history (traveling route). For example, if the own vehicle position acquired from the navigation apparatus corresponds to a position where a curved road was passed in the past, it is possible that the road in front of the vehicle is determined as a curved road.

Note that, from now, when the static vehicle probability and the roadside static object probability are not distinguished therebetween, they will be generally referred to as a "static object probability".

The processing apparatus 10 determines whether to carry out calling attention to the driver concerning the static object detected by the object detection sensor 20 based on information from the object detection sensor 20. A manner of calling attention is any manner. For example, calling attention can be implemented by using the throttle control apparatus 50, the brake control apparatus 52, the indicator 54, the buzzer 56, or so. For example, if the throttle control apparatus 50 or the brake control apparatus 52 is used, it is possible to generate deceleration the driver can feel as calling attention. If the indicator 54 or the buzzer 56 is used, it is possible to generate a message, an alarm sound, or so, as calling attention. It is also possible that calling attention is to generate a predetermined torque to the steering. Note that it is possible to output calling attention gradually if necessary, it is possible to output calling attention only once, or it is possible to output calling attention continuously if necessary.

A calling attention carrying-out condition is a condition to be satisfied when calling attention should be carried out to the driver, and is any condition. It is possible that the calling attention carrying-out condition is set by using various parameters such as the lateral position of the static object (the position of the static object in the width direction with respect to the own vehicle), the distance of the static object (the distance of the static object with respect to the own vehicle in the forward/backward direction), the motion vector of the static object with respect to the own vehicle (the minus direction of the motion vector of the own vehicle directed to the static object), a collision lateral position, the static object probability, the period of time (expected value) that will elapse before the collision with the static object: TTC (Time to Collision), and/or the like. It is possible that the motion vector is calculated from the position information of the static object at a plurality of points of time by using the RANSACK (RANdom SAmple Consensus) method or so. It is possible that the TTC is calculated from dividing the distance of the static object with respect to the own vehicle (the distance of the static object with respect to the own vehicle in the forward/backward direction) by the current vehicle speed. Note that, the collision lateral position means a position on a front part of the own vehicle which the static object collides with if the static object would collide with the own vehicle, and specifically, corresponds to an intersection point at which the extended line of the motion vector intersects with a line in the horizontal direction tangent to the front part of the own vehicle (the position of the intersection point at which the extended motion vector intersects with the front part of the own vehicle).

The calling attention carrying-out condition can include a condition that is satisfied when the collision probability calculated in consideration of various parameters such as those mentioned above is greater than or equal to a predetermined probability. It is also possible that the calling attention carrying-out condition is a condition that is satisfied when some of various parameters such as those mentioned above satisfy respective conditions that are set therefor. For example, the calling attention carrying-out condition can be a condition satisfied when the static object probability is greater than or equal to a predetermined probability, the lateral position falls within a predetermined range, and the TTC is less than or equal to a predetermined period of time.

The processing apparatus 10 determines whether to carry out calling attention, based on the calling attention carrying-out condition that is different between a case of determining that the static object detected by the object detection sensor 20 is a static vehicle and a case of determining that the static object detected by the object detection sensor 20 is a roadside static object. At this time, the calling attention carrying-out condition in the case of determining that the static object is a static vehicle has a threshold that is set to be lower (in other words, is a condition easier to be satisfied) than a threshold of the calling attention carrying-out condition in the case of determining that the static object is a roadside static object. This specific difference depends on the contents of the calling attention carrying-out condition. Typically, the calling attention carrying-out condition includes a condition concerning the position in the lateral direction, and in this case, it is possible to set a difference concerning the position in the lateral direction. For example, it is assumed that the calling attention carrying-out condition is a condition satisfied when the static object probability is greater than or equal to a predetermined probability, the lateral position falls within a predetermined range, and the TTC is less than or equal to a predetermined period of time. In this case, it is possible that the predetermined range for the lateral position is set to be wider in a case of determining that the static object is a static vehicle than a case of determining that the static object is a roadside static object. Also, it is possible that the predetermined probability for the static object probability (the static vehicle probability and the roadside static object probability) is set to be lower in the case of determining that the static object is a static vehicle than the case of determining that the static object is a roadside static object. Also, it is possible that the predetermined period of time for the TTC is set to be longer in the case of determining that the static object is a static vehicle than the case of determining that the static object is a roadside static object. If the calling attention carrying-out condition includes a condition that the collision lateral position falls within a predetermined range, it is possible to set the predetermined range for the collision lateral position to be wider in the case of determining that the static object is a static vehicle than the case of determining that the static object is a roadside static object. Also, if the calling attention carrying-out condition includes a condition that the calculated collision probability is greater than or equal to a predetermined probability, it is possible that the predetermined probability for the collision probability is set lower in the case of determining that the static object is a static vehicle than the case of determining that the static object is a roadside static object.

It is possible that, if the processing apparatus 10 determines, after calling attention, that a collision with the static object detected by the object detection sensor 20 is unavoidable, the processing apparatus 10 carries out collision avoidance control for avoiding a collision with the static object. The collision avoidance control can be such that, using the brake control apparatus 52, deceleration is generated so as to avoid a collision with the static object, for example. A condition for carrying out the collision avoidance control (collision unavoidability determination condition) can be set in consideration of parameters the same as or similar to those of the calling attention carrying-out condition. However, it is also possible to make a setting such that the collision avoidance control is carried out following the calling attention (in other words, it is also possible to make a setting such that the collision avoidance control is carried out after the calling attention).

It is possible that the processing apparatus 10 carries out, after the calling attention, collision damage reduction control for reducing damage at a time of a collision with the static object detected by the object detection sensor 20. The collision avoidance control can include, for example, control of reducing the speed at a time of collision with the static object, activating the seat belt pre-tensioner or so, and/or the like, by using the throttle control apparatus 50 and/or the brake control apparatus 52.

If the calling attention is carried out to the driver when a static object having a likelihood of colliding with the vehicle is detected by the object detection sensor 20, it becomes easier for the driver himself or herself to whom the calling attention has been thus carried out to notice the static object and carry out a collision avoidance operation by himself or herself. Therefore, from the viewpoint of facilitating the collision avoidance operation by the driver himself or herself, it is preferable to carry out the calling attention as soon as possible. However, if the calling attention is carried out earlier uniformly for all the static objects, such a problem may occur that unnecessary calling attention (or too early calling attention) occurs. For example, whereas the driver feels earlier calling attention beneficial in a case of a static vehicle, the driver feels earlier calling attention troublesome in a case of a roadside static object in many cases, although both belong to static objects.

In this regard, according to the present embodiments, as described above, the calling attention carrying-out condition in a case of determining the static object as a static vehicle is set to be an easier condition than the calling attention carrying-out condition in a case of determining the static object as a roadside static object. Thereby, it is possible that while the calling attention is facilitated in a case of determining the static object as a static vehicle, the calling attention is controlled in a case of determining the static object as a roadside static object. Thereby, it becomes possible to carry out the calling attention to the driver in a way appropriate depending on the type of the static object.

FIG. 2 is a flowchart showing one example of a process carried out by the processing apparatus 10. It is possible that the process shown in FIG. 2 is repetitiously carried out in every predetermined cycle while the ignition switch is in its turned-on state, for example. It is also possible that the process shown in FIG. 2 is repetitiously carried out in every predetermined cycle while the vehicle is travelling (the vehicle speed is greater than or equal to a predetermined value). Note that, as one example, description will now be made assuming a case where the object detection sensor 20 is the radar sensor 22.

In Step 300, the processing apparatus 10 determines whether the static object detected by the radar sensor 22 is a static vehicle. Note that if no object is detected by the radar sensor 22, or no static object is detected by the radar sensor 22 (for example, if only a moving object is detected), the processing apparatus 10 finishes the process as it is, and waits for a detection of a static object. As one example, it will now be assumed that if the static object detected by the radar sensor 22 satisfies the following conditions, the static object is determined as a static vehicle, and a static vehicle flag is turned on.

There is a collection of reflecting points concerning the static object. Note that a collection of reflecting points means a collection of a plurality (for example, greater than or equal to 4) of reflecting points having approximately the same positions (lateral positions or distances), and also, having approximately the same relative speeds.

The distance from the front to the back of the collection of reflecting points concerning the static object is less than or equal to 5 m.

The lateral position of the collection of reflecting points concerning the static object is less than or equal to 1 m.

In Step 300, if the processing apparatus 10 determines that the static object detected by the radar sensor 22 is a static vehicle, the processing apparatus 10 proceeds to Step 302. If the processing apparatus 10 determines that the static object detected by the radar sensor 22 is not a static vehicle, the processing apparatus 10 proceeds to Step 308.

In Step 302, the processing apparatus 10 calculates a static vehicle probability (the probability that the static object detected by the radar sensor 22 is a static vehicle). In one example, a static vehicle flag counter is set which is, in every predetermined cycle, incremented if the static vehicle flag has its turned-on state or decremented when the static vehicle flag has its turned-off state, and the value of the static vehicle flag counter is treated as the static vehicle probability. Note that the initial value of the static vehicle flag counter is 0, and it is possible that, if the static vehicle flag is kept in the turned-off state for greater than or equal to a predetermined period of time, the static vehicle flag counter is reset to 0. Note that, it is also possible that, in Step 302, if the calculated static vehicle probability is less than or equal to a predetermined reference value, the processing apparatus proceeds to Step 316.

In Step 304, the processing apparatus 10 calculates a static vehicle activation area. The static vehicle activation area is such an area that, if a static vehicle is present within the area, (one element of) the calling attention carrying-out condition is satisfied. In one example, the static vehicle activation area is assumed as an area prescribed by the lateral position. In other words, it is assumed that if the lateral position falls within a first predetermined lateral position range, the calling attention carrying-out condition is satisfied. In this case, the static vehicle activation area corresponds to the first predetermined lateral position range.

In Step 306, the processing apparatus 10 calculates a static vehicle activation timing. The static vehicle activation timing corresponds to a calling attention carrying-out timing concerning a static vehicle. In one example, the static vehicle activation timing is assumed as a timing prescribed by the TTC, and it is assumed that at a timing at which the TTC becomes less than or equal to a first predetermined period of time, the calling attention is carried out. Therefore, in this example, if it is determined that the static object detected by the radar sensor 22 is a static vehicle, the calling attention is carried out when the static vehicle activation timing has come under the condition where the lateral position of the static vehicle is within the static vehicle activation area.

In Step 308, the processing apparatus 10 determines whether the static object detected by the radar sensor 22 is a roadside static object. In one example, it is assumed that if the static object detected by the radar sensor 22 satisfies the following condition, the processing apparatus 10 determines the static object as a roadside static object, and turns on a roadside static object flag.

The reflecting points concerning the static object are at positions less than or equal to 0.5 m from the road edge in the lateral direction. Note that, it is possible that the lateral position of the road edge is detected by the radar sensor 22. It is also possible that, as an AND condition to the above-mentioned condition, a condition that "a plurality of the reflecting points concerning the static object are placed in series along the road shape (curvature radius)" is added.

In Step 308, if the processing apparatus 10 determines that the static object detected by the radar sensor 22 is a roadside static object, the processing apparatus 10 proceeds to Step 310. If the processing apparatus 10 determines that the static object detected by the radar sensor 22 is not a roadside static object (in other words, if the processing apparatus 10 determines that the static object detected by the radar sensor 22 is neither a static vehicle nor a roadside static object), the processing apparatus 10 proceeds to Step 316.

In Step 310, the processing apparatus 10 calculates a roadside static object probability (the probability that the static object detected by the radar sensor 22 is a roadside static object). In one example, a roadside static object flag counter is set which is, in every predetermined cycle, incremented if the roadside static object flag has its turned-on state or decremented when the roadside static object flag has its turned-off state, and the value of the roadside static object flag counter is treated as the roadside static object probability. Note that the initial value of the roadside static object flag counter is 0, and it is possible that, if the roadside static object flag is kept in the turned-off state for greater than or equal to a predetermined period of time, the roadside static object flag counter is reset to 0. Note that, it is also possible that in Step 310, if the calculated roadside static object probability is less than or equal to a predetermined reference value, the processing apparatus proceeds to Step 316.

In Step 312, the processing apparatus 10 calculates a roadside static object activation area. The roadside static object activation area is such an area that, if a roadside static object is present within the area, (one element of) the calling attention carrying-out condition is satisfied. In one example, the roadside static object activation area is assumed as an area prescribed by the lateral position. In other words, it is assumed that if the lateral position falls within a second predetermined lateral position range, the calling attention carrying-out condition is satisfied. In this case, the roadside static object activation area corresponds to the second predetermined lateral position range. The roadside static object activation area is set to be an area narrower than the static vehicle activation area. In other words, the second predetermined lateral position range is an area narrower than the first predetermined lateral position range. Therefore, in this regard, in a case of a roadside static object, the calling attention carrying-out condition is harder to be satisfied than a case of a static vehicle.

In Step 314, the processing apparatus 10 calculates a roadside static object activation timing. The roadside static object activation timing corresponds to a calling attention carrying-out timing concerning a roadside static object. In one example, the roadside static object activation timing is assumed as a timing prescribed by the TTC, and it is assumed that at a timing at which the TTC becomes less than or equal to a second predetermined period of time, the calling attention is carried out. Therefore, if it is determined that the static object detected by the radar sensor 22 is a roadside static object, the calling attention is carried out when the roadside static object activation timing has come under the condition where the lateral position of the roadside static object is within the roadside static object activation area. The roadside static object activation timing is set to be later than the static vehicle activation timing. In other words, the second predetermined period of time is shorter than the first predetermined period of time. Therefore, in this regard, in a case of a roadside static object, the calling attention carrying-out condition is harder to be satisfied than a case of a static vehicle.

In Step 316, the processing apparatus 10 calculates a static object activation area. The static object activation area is such an area that, if a static object (a static object determined neither as a roadside static object nor as a static vehicle) is present within the area, (one element of) the calling attention carrying-out condition is satisfied. In one example, the static object activation area is assumed as an area prescribed by the lateral position. In other words, it is assumed that if the lateral position falls within a third predetermined lateral position range, the calling attention carrying-out condition is satisfied. In this case, the static object activation area corresponds to the third predetermined lateral position range. The static object activation area can be set to be an area narrower than the static vehicle activation area but wider than the roadside static object activation area. In other words, the third predetermined lateral position range can be an area narrower than the first predetermined lateral position but wider than the second predetermined lateral position range. For example, considering by the ratio, assuming that the third predetermined lateral position range is "1", the first predetermined lateral position range can be "1.2", and the second predetermined lateral position range can be "0.8".

In Step 318, the processing apparatus 10 calculates a static object activation timing. The static object activation timing corresponds to a calling attention carrying-out timing concerning a static object. In one example, the static object activation timing is assumed as a timing prescribed by the TTC, and it is assumed that at a timing at which the TTC becomes less than or equal to a third predetermined period of time, the calling attention is carried out. Therefore, if it is determined that the static object detected by the radar sensor 22 is neither a roadside static object nor a static vehicle, the calling attention is carried out when the static object activation timing has come under the condition where the lateral position of the static object is within the static object activation area. The static object activation timing can be set to be a timing later than the static vehicle activation timing but earlier than the roadside static object activation timing. In other words, the third predetermined period of time can be a period of time shorter than the first predetermined period of time but longer than the second predetermined period of time. For example, considering by the ratio, assuming that the third predetermined period of time is "1", the first predetermined period of time can be "1.2", and the second predetermined period of time can be "0.8".

According to the process shown in FIG. 2, the static vehicle activation area is set to be an area wider than the roadside static object activation area. Therefore, when it is determined that the static object is a static vehicle, it is possible to carry out the calling attention for the static object in a wider area than a case where the static object is a roadside static object. Thus, according to the process shown in FIG. 2, it becomes possible to carry out the calling attention to the driver concerning a static object in an area (in particular, a lateral direction range) appropriate to the type of the static object.

Also, according to the process shown in FIG. 2, the static vehicle activation timing is set to be a timing earlier than the roadside static object activation timing. Therefore, in a case of determining the static object as a static vehicle, it is possible to carry out the calling attention earlier than a case of determining the static object as a roadside static object. In other words, in a case of determining the static object as a roadside static object, it is possible to delay a timing of the calling attention. Thus, according to the process shown in FIG. 2, it is possible to carry out the calling attention to the driver in a timing appropriate to the type of the static object.

Note that, in the process shown in FIG. 2, Step 302 can be omitted. It is also possible that the static vehicle probability acquired by the process of Step 302 is used for setting a plurality of stages of the calling attention carrying-out condition. In this case, the calling attention carrying-out condition can be varied in a plurality of stages in such a manner that the higher the static vehicle probability becomes, the easier the calling attention carrying-out condition is to be satisfied. For example, the static vehicle activation area can be varied in a plurality of stages depending on the static vehicle probability in such a manner that the higher the static vehicle probability becomes, the wider the static vehicle activation area becomes. In the same way, the static vehicle activation timing can be varied in a plurality of stages depending on the static vehicle probability in such a manner that the higher the static vehicle probability becomes, the longer the static vehicle activation timing becomes.

In the same way, Step 310 can be omitted. It is also possible that the roadside static object probability acquired by the process of Step 310 is used for setting a plurality of stages of the calling attention carrying-out condition. In this case, the calling attention carrying-out condition can be varied in a plurality of stages in such a manner that the higher the roadside static object probability becomes, the harder the calling attention carrying-out condition is to be satisfied. For example, the roadside static object activation area can be varied in a plurality of stages depending on the roadside static object probability in such a manner that the higher the roadside static object probability becomes, the narrower the roadside static object activation area becomes. In the same way, the static vehicle activation timing can be varied in a plurality of stages depending on the roadside static object probability in such a manner that the higher the roadside static object probability becomes, the shorter the roadside static object activation timing becomes.

Also, in the process of Step 310 shown in FIG. 2, in a case where the road in front of the vehicle is a curved road, as described above, it is possible to calculate the roadside static object probability to be higher than a case where the road in front of the vehicle is a straight road. This is because when the road in front of the vehicle is a curved road, unnecessary calling attention for a roadside static object is likely to be generated. Thereby, when the road in front of the vehicle is a curved road, the calling attention carrying-out condition is harder to be satisfied. Thus, it is possible to reduce unnecessary calling attention for a roadside static object. From the same viewpoint, it is also possible that the conditions of the processes of Steps 312 and 314 are used only when the road in front of the vehicle is a curved road. For example, when the road in front of the vehicle is a straight road, it is possible to use the conditions of Steps 316 and 318 of FIG. 2 as the calling attention carrying-out condition even when it is determined that the static object is a roadside static object. It is also possible that, from the same viewpoint, the roadside static object activation area is set to be narrower in a case where the road in front of the vehicle is a curved road than a case where the road in front of the vehicle is a straight road. In the same way, the roadside static object activation timing can be set to be shorter in a case where the road in front of the vehicle is a curved road than a case where the road in front of the vehicle is a straight road.

In the same way, in the process of Step S302 shown in FIG. 2, when a likelihood that there is a static vehicle in the direction in which the vehicle is traveling is high (for example, when there is a traffic jam, a red light, a railroad crossing, a stop line, or so, in the direction in which the vehicle is traveling) it is possible to calculate the static vehicle probability to be higher, as described above. Thereby, when a likelihood that there is a static vehicle in the direction in which the vehicle is traveling is high, the calling attention carrying-out condition is easier to be satisfied. Thus, it is possible to achieve the calling attention necessary for a static vehicle at high accuracy.

Thus, each embodiment has been described in detail. However, an embodiment is not to be limited to a specific embodiment, and various modifications and changes can be made within the scope recited in the claims. It is also possible to combine all or some of the elements of the above-described embodiments.

For example, in the above-described embodiments, such a calling attention carrying-out condition is set that, even if it is determined that the static object is a roadside static object, the calling attention is performed in consideration of the calling attention being useful when a likelihood of an actual collision is high even if the static object is a roadside static object. However, it is also possible to set such a calling attention carrying-out condition that, when it is determined that the static object is a roadside static object, the calling attention is not substantially carried out. In this case, it is possible that the collision avoidance control is carried out for the static object determined as a roadside static object. It is also possible that the calling attention carrying-out condition for the static object determined as a roadside static object is set to be the same as the condition for carrying out the collision avoidance control.

In the above-described embodiments, the calling attention carrying-out condition is changed between a case of determining the static object as a static vehicle and a case of determining the static object as a roadside static object. However, instead of or in addition thereto, it is possible to change the condition for carrying out another driving assistance. For example, the condition for carrying out the collision avoidance control can be changed. Also in this case, in the same way, the condition for carrying out the collision avoidance control can be set in such a manner that the condition for carrying out the collision avoidance control becomes easier to be satisfied in a case of determining the static object as a static vehicle than in a case of determining the static object as a roadside static object. It is possible that the condition for carrying out the collision avoidance control is varied depending on the static object probability, in the same manner as the above-described calling attention carrying-out condition, and the way of varying it can be the same as the above-described calling attention carrying-out condition.

Also, in the above-described embodiments, the condition for carrying out the collision avoidance control can be varied depending on whether the driver operates the accelerator, whether the driver performs braking, or so. For example, the condition for carrying out the collision avoidance control can be changed in such a direction that the condition for carrying out the collision avoidance control becomes harder to be satisfied when the accelerator position is 0 (when the foot is separated from the accelerator pedal).

Note that in the above descriptions, the lateral position is, for example, a parameter indicating a difference in the lateral direction with respect to the center axis of the own vehicle in the forward/backward direction; and it is possible to use the left and right edges of the own vehicle as reference positions therefor, it is also possible to use the center of the own vehicle in the lateral direction as a reference position therefor, and thus, the reference position therefor is any position.

DESCRIPTION OF REFERENCE SIGNS 1 vehicle driving assistance apparatus
10 processing apparatus
20 object detection sensor
22 radar sensor
24 image sensor
40 vehicle sensor
50 throttle control apparatus
52 brake control apparatus
54 indicator
56 buzzer

The invention claimed is:

1. A vehicle driving assistance apparatus comprising,
a sensor that detects an object around an own vehicle; and
a processing apparatus that determines whether the object detected by the sensor is a static vehicle or a roadside static object, carries out driving assistance if a first driving assistance carrying-out condition is satisfied when determining the object as a static vehicle, and carries out the driving assistance if a second driving assistance carrying-out condition is satisfied when determining the object as a roadside static object, wherein
a threshold concerning the first driving assistance carrying-out condition is lower than a threshold concerning the second driving assistance carrying-out condition,
the first and second driving assistance carrying-out conditions include conditions that a lateral position of the object with respect to the own vehicle falls within a predetermined range,
the predetermined range concerning the first driving assistance carrying-out condition is greater than the predetermined range concerning the second driving assistance carrying-out condition,
the first and second driving assistance carrying-out conditions include conditions that an estimated value of a period of time elapsing until a collision between the own vehicle and the object is less than or equal to a predetermined period of time, and
the predetermined period of time concerning the first driving assistance carrying-out condition is greater than the predetermined period of time concerning the second driving assistance carrying-out condition.

2. The vehicle driving assistance apparatus as claimed in claim 1, wherein
when determining the object as a static vehicle, the processing apparatus calculates a first index value indicating a probability that the object is a static vehicle, determines based on a third driving assistance carrying-out condition whether to carry out the driving assistance if the calculated first index value is less than a predetermined reference value, and determines based on the first driving assistance carrying-out condition whether to carry out the driving assistance if the calculated first index value is greater than or equal to the predetermined reference value, and
a threshold concerning the first driving assistance carrying-out condition is lower than a threshold concerning the third driving assistance carrying-out condition.

3. The vehicle driving assistance apparatus as claimed in claim 1, wherein
when determining that the object as a roadside static object, the processing apparatus calculates a second index value indicating a probability that the object is a roadside static object, determines based on a third driving assistance carrying-out condition whether to carry out the driving assistance if the calculated second index value is less than a predetermined reference value, and determines based on the second driving assistance carrying-out condition whether to carry out the driving assistance if the calculated second index value is greater than or equal to the predetermined reference value, and
a threshold concerning the second driving assistance carrying-out condition is lower than a threshold concerning the third driving assistance carrying-out condition.

4. The vehicle driving assistance apparatus as claimed in claim 3, wherein
the second index value is calculated in such a manner that the second index value is higher in a case where a road in front of the own vehicle is a curved road than a case where the road in front of the own vehicle is a straight road.

5. A vehicle driving assistance apparatus comprising,
a sensor that detects an object around an own vehicle; and
a processing apparatus that determines whether the object detected by the sensor is a static vehicle or a roadside static object, carries out driving assistance if a first driving assistance carrying-out condition is satisfied when determining the object as a static vehicle, and carries out the driving assistance if a second driving assistance carrying-out condition is satisfied when determining the object as a roadside static object, wherein
a threshold concerning the first driving assistance carrying-out condition is lower than a threshold concerning the second driving assistance carrying-out condition,
the first and second driving assistance carrying-out conditions include conditions that a lateral position of the object with respect to the own vehicle falls within a predetermined range,
the predetermined range concerning the first driving assistance carrying-out condition is greater than the predetermined range concerning the second driving assistance carrying-out condition,
when determining the object as a static vehicle, the processing apparatus calculates a first index value indicating a probability that the object is a static vehicle, determines based on a third driving assistance carrying-out condition whether to carry out the driving assistance if the calculated first index value is less than a predetermined reference value, and determines based on the first driving assistance carrying-out condition whether to carry out the driving assistance if the calculated first index value is greater than or equal to the predetermined reference value, and
a threshold concerning the first driving assistance carrying-out condition is lower than a threshold concerning the third driving assistance carrying-out condition.

6. The vehicle driving assistance apparatus as claimed in claim 5, wherein
when determining that the object as a roadside static object, the processing apparatus calculates a second index value indicating a probability that the object is a roadside static object, determines based on a third driving assistance carrying-out condition whether to carry out the driving assistance if the calculated second index value is less than a predetermined reference value, and determines based on the second driving assistance carrying-out condition whether to carry out the driving assistance if the calculated second index value is greater than or equal to the predetermined reference value, and
a threshold concerning the second driving assistance carrying-out condition is lower than a threshold concerning the third driving assistance carrying-out condition.

7. The vehicle driving assistance apparatus as claimed in claim 6, wherein
the second index value is calculated in such a manner that the second index value is higher in a case where a road in front of the own vehicle is a curved road than a case where the road in front of the own vehicle is a straight road.

8. A vehicle driving assistance apparatus comprising,
a sensor that detects an object around an own vehicle; and
a processing apparatus that determines whether the object detected by the sensor is a static vehicle or a roadside static object, carries out driving assistance if a first driving assistance carrying-out condition is satisfied when determining the object as a static vehicle, and carries out the driving assistance if a second driving assistance carrying-out condition is satisfied when determining the object as a roadside static object, wherein
a threshold concerning the first driving assistance carrying-out condition is lower than a threshold concerning the second driving assistance carrying-out condition,
the first and second driving assistance carrying-out conditions include conditions that an estimated value of a period of time elapsing until a collision between the own vehicle and the object is less than or equal to a predetermined period of time,
the predetermined period of time concerning the first driving assistance carrying-out condition is greater than the predetermined period of time concerning the second driving assistance carrying-out condition,
when determining the object as a static vehicle, the processing apparatus calculates a first index value indicating a probability that the object is a static vehicle, determines based on a third driving assistance carrying-out condition whether to carry out the driving assistance if the calculated first index value is less than a predetermined reference value, and determines based on the first driving assistance carrying-out condition whether to carry out the driving assistance if the calculated first index value is greater than or equal to the predetermined reference value, and
a threshold concerning the first driving assistance carrying-out condition is lower than a threshold concerning the third driving assistance carrying-out condition.

9. The vehicle driving assistance apparatus as claimed in claim 8, wherein
when determining that the object as a roadside static object, the processing apparatus calculates a second index value indicating a probability that the object is a roadside static object, determines based on a third driving assistance carrying-out condition whether to carry out the driving assistance if the calculated second index value is less than a predetermined reference value, and determines based on the second driving assistance carrying-out condition whether to carry out the driving assistance if the calculated second index value is greater than or equal to the predetermined reference value, and
a threshold concerning the second driving assistance carrying-out condition is lower than a threshold concerning the third driving assistance carrying-out condition.

10. The vehicle driving assistance apparatus as claimed in claim 9, wherein
the second index value is calculated in such a manner that the second index value is higher in a case where a road in front of the own vehicle is a curved road than a case where the road in front of the own vehicle is a straight road.

* * * * *